United States Patent [19]

Wafer et al.

[11] Patent Number: 4,711,262

[45] Date of Patent: Dec. 8, 1987

[54] UNI-DIRECTIONAL/BI-DIRECTIONAL GATE VALVE

[75] Inventors: Don B. Wafer; Claud C. Barrington, both of Houston, Tex.

[73] Assignee: FMC Corporation, Chicago, Ill.

[21] Appl. No.: 837,317

[22] Filed: Mar. 3, 1986

Related U.S. Application Data

[63] Continuation of Ser. No. 696,959, Jan. 31, 1985, abandoned.

[51] Int. Cl.$^4$ .............................................. F17D 1/18
[52] U.S. Cl. ................................ 137/14; 137/625.33; 251/327; 251/82
[58] Field of Search ............... 251/77, 266, 326–329, 251/144, 175, 82; 137/72, 75, 77, 14, 625.33

[56] References Cited

U.S. PATENT DOCUMENTS

| | | | |
|---|---|---|---|
| 2,903,006 | 9/1959 | Seaver | 137/77 |
| 3,123,090 | 3/1964 | Bredtschneider | 251/327 |
| 4,214,600 | 7/1980 | Williams et al. | 137/72 |
| 4,354,663 | 10/1982 | Vanderburg et al. | 251/327 |
| 4,364,544 | 12/1982 | Kim | 251/328 |
| 4,373,700 | 2/1983 | Buchta | 251/214 |
| 4,433,827 | 2/1984 | Redman et al. | 251/266 |
| 4,510,960 | 4/1985 | Jennings et al. | 137/72 |
| 4,540,012 | 9/1985 | Bridges | 137/72 |

Primary Examiner—Samuel Scott
Assistant Examiner—Noah Kamen
Attorney, Agent, or Firm—W. William Ritt, Jr.; Richard B. Megley

[57] ABSTRACT

A gate valve includes a pressure relief port located on the gate valve. When the gate is positioned such that the port communicates with one of the two flow passages and the valve body interior, uni-directional flow is permitted from the other of the flow passages. Flow is blocked bi-directionally when the port is positioned out of communication with the flow passage.

2 Claims, 8 Drawing Figures

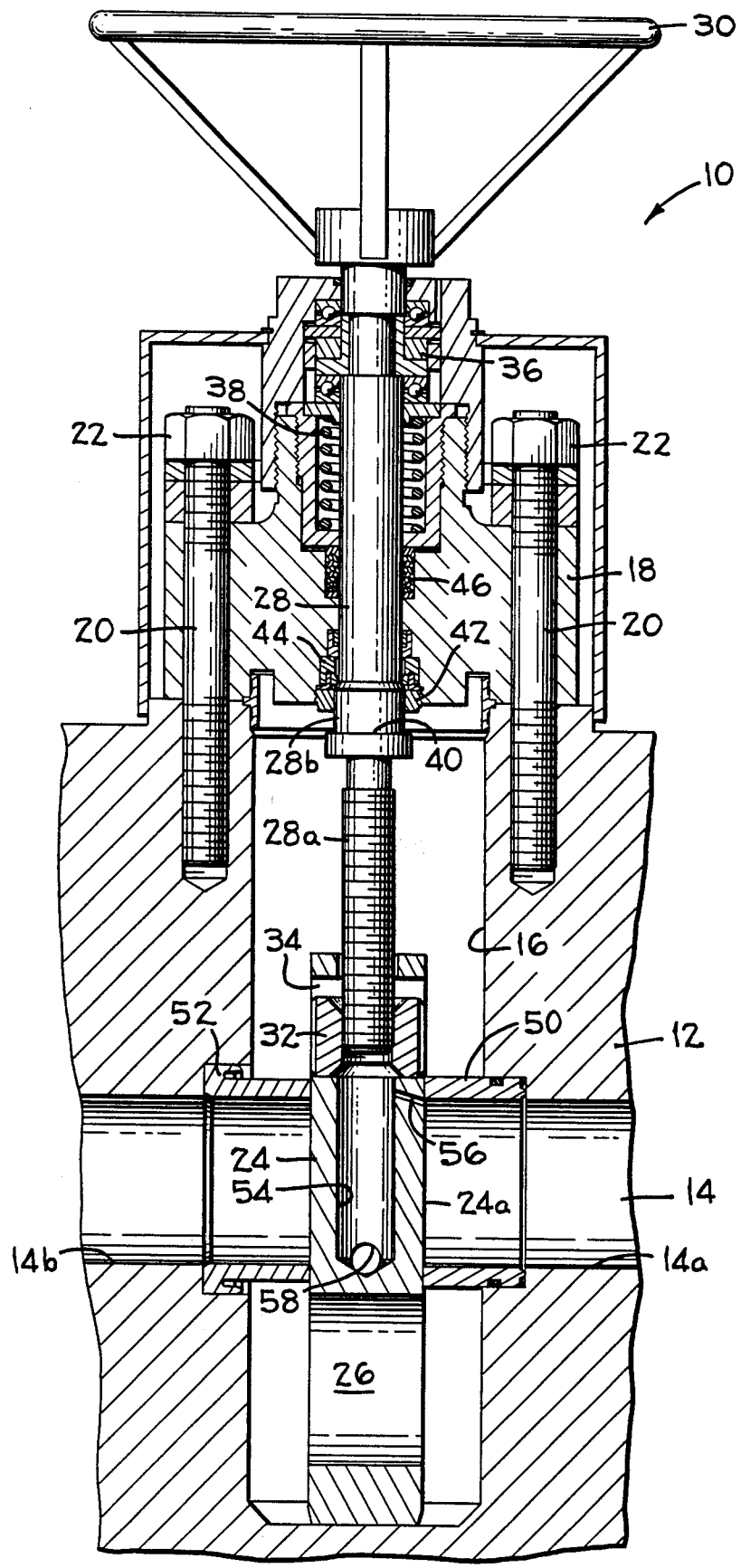

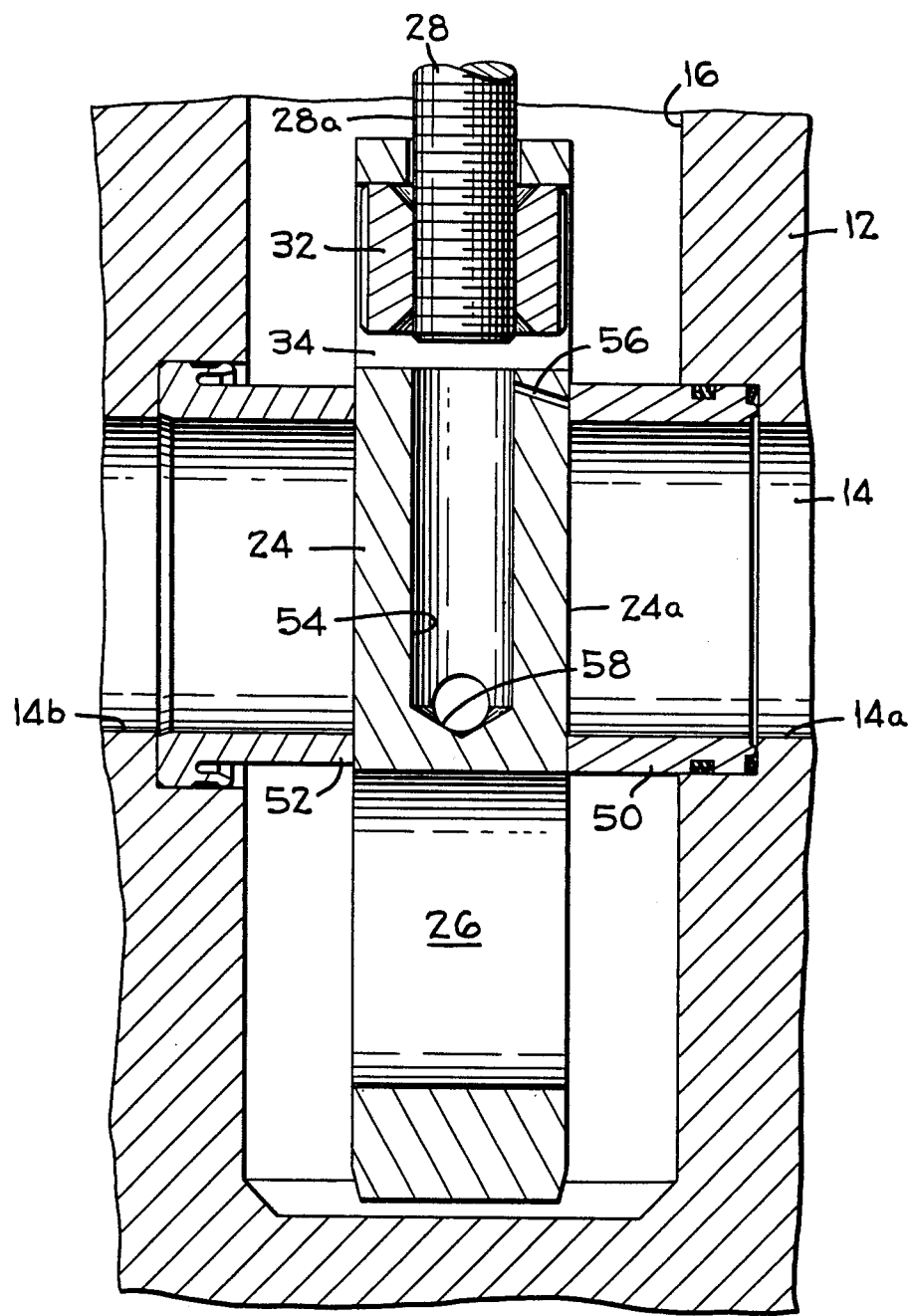

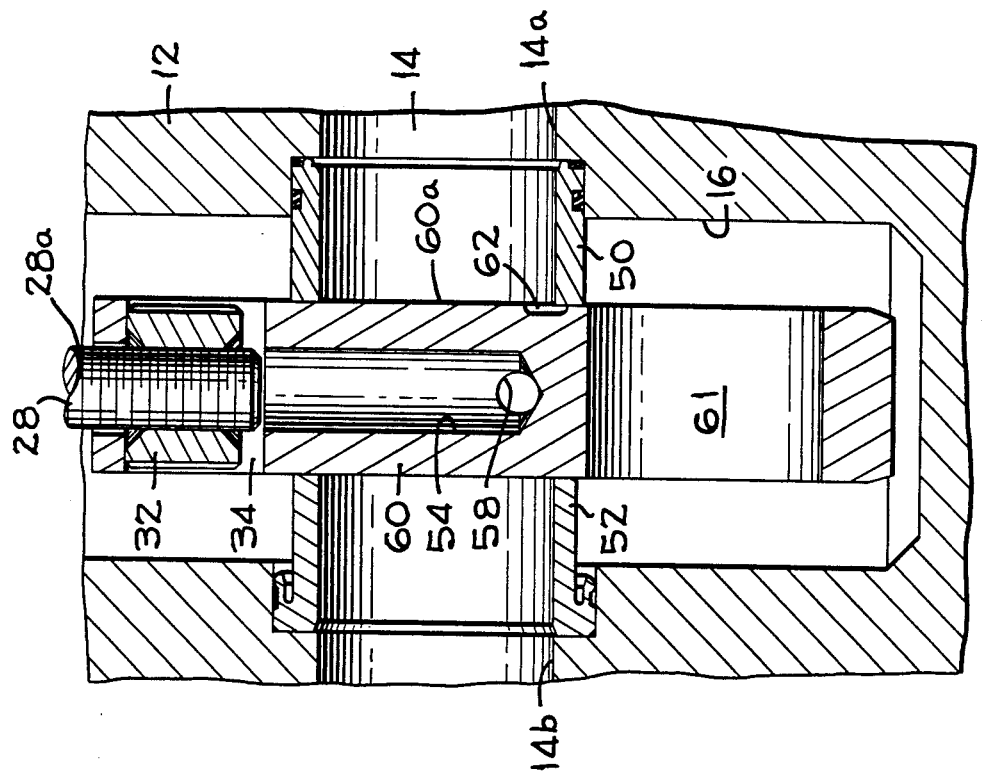
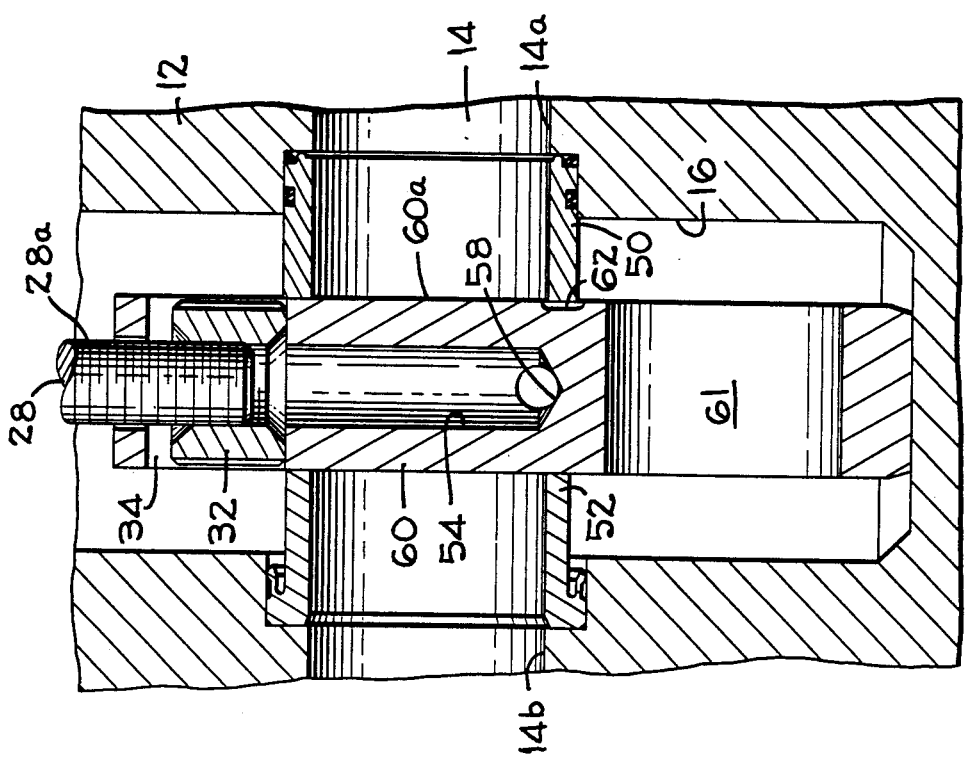

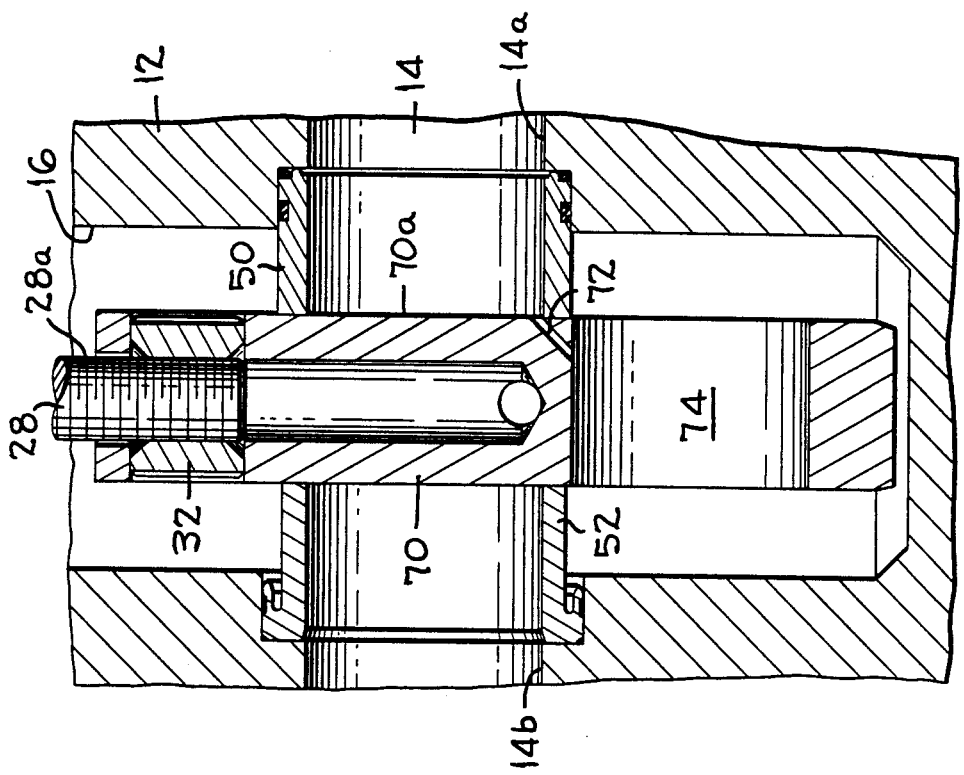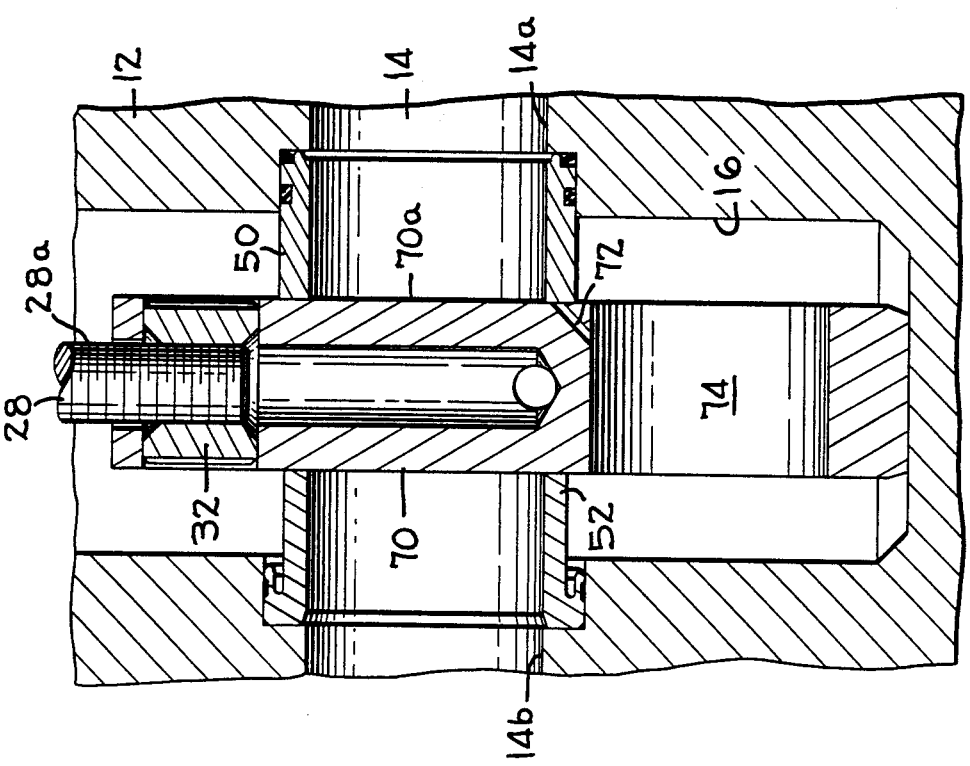

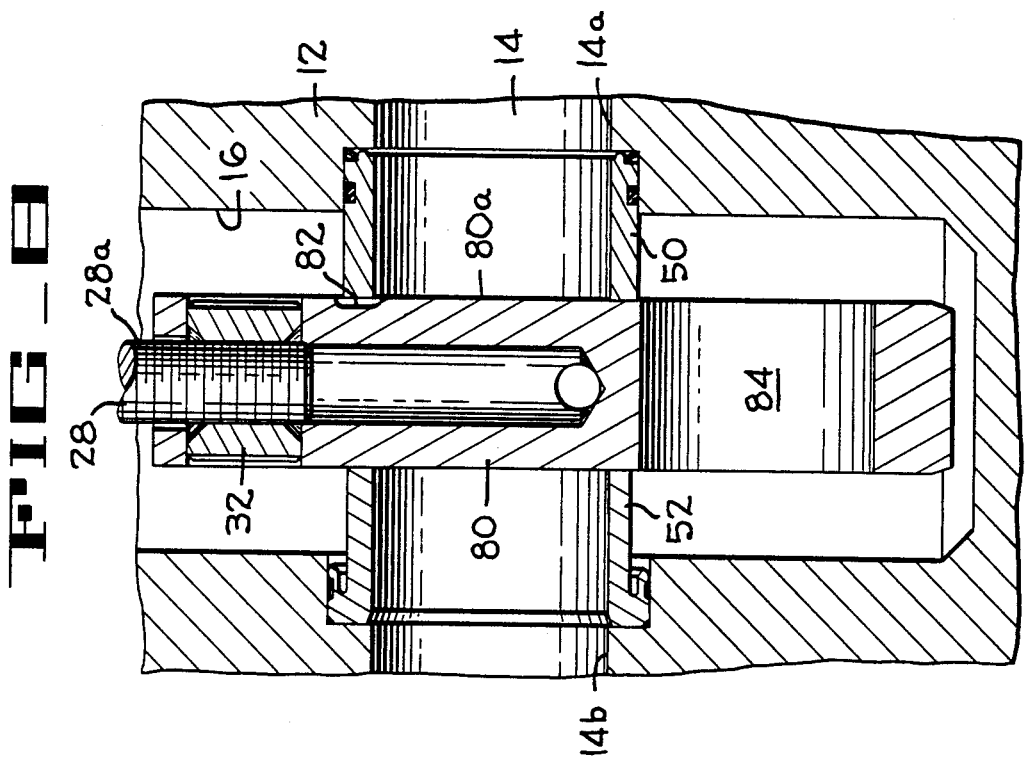
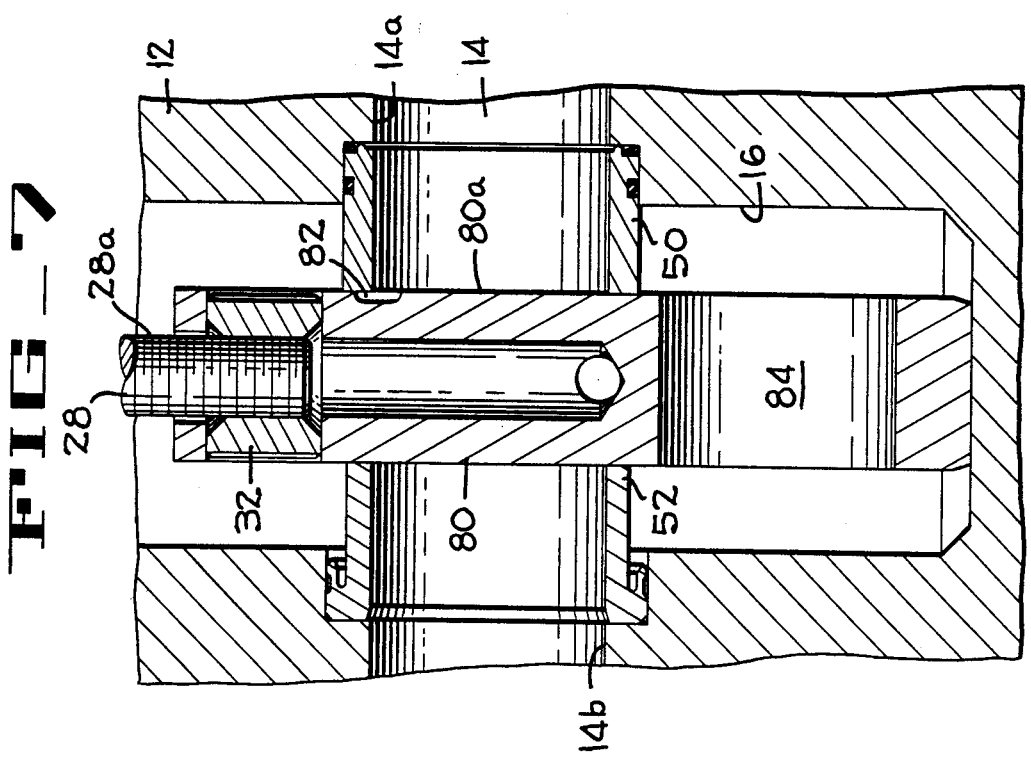

UNI-DIRECTIONAL/BI-DIRECTIONAL GATE VALVE

This application is a continuation of application Ser. No. 696,959, filed Jan. 31, 1985, now abandoned.

BACKGROUND OF THE INVENTION

This invention relates to fluid control valves, and more particularly to gate valves for use where elevated temperatures and pressures are encountered.

Bi-directional sealing gate valves of various designs are commonly used for controlling the flow of fluids in land based and subsea oil or gas wells and in pipelines of the petroleum and petrochemical industries. When two such valves are installed in series and fluid is trapped between the two closed gates, a line pressure buildup can occur due to fluid expansion that results if the temperature of the fluid increases. This increase in temperature typically occurs when, for example, valves at a surface (land or platform) wellhead are closed at nighttime and the ambient temperature rises the following day. Pressure buildup can be substantial with temperature increases of only 50–75 degrees Farenheit, but is much greater in the event of a fire which could raise the fluid temperature to 1000–1200 degrees Farenheit or more. In either event, the pressure could build up to an unsafe level and cause the valves to leak or even rupture. Fluid-trapping and the resulting dangers that are created when the ambient temperature rises significantly also exist in a single valve installation if the valve design does not include a means for self-relieving the body cavity pressure.

Attempts to provide solutions to the foregoing problems include the provision for uni-directional sealing of one valve in the two valve series so that pressure buildup can always by-pass back through the uni-directional valve. This solution, however, has the disadvantage of preventing pressure testing against the uni-directional valve in a reverse direction, an important and desirable feature for most oil-field applications.

SUMMARY OF THE INVENTION

Broadly considered, the present invention comprises providing a port, groove, undercut or other pressure relief means in the gate of a gate valve so as to facilitate uni-directional sealing by placing the gate in one of two closed positions, and bi-directional sealing by placing the gate in the other closed position. When the gate is in one of these closed positions the port or the like provides communication between the valve body and the flow passage extending from the adjacent gate face in which the port is located, and when in the other closed position the port is blocked and thus sealed off by the adjacent flow passage seat assembly. In one embodiment the port is located in the gate so that when the valve is in its normally closed condition the port is closed or blocked off, whereby the valve is in a bi-directional sealing mode, and when the gate is slightly backed off into another, but still closed, position the port is exposed to the flow passage, whereby the valve is in a uni-directional sealing mode. In another embodiment the position of the port is reversed, whereby when the valve is in its normally closed condition the port is open, and when the gate is backed off or otherwise moved into its other closed position the port is blocked. The invention can be embodied in all types of gate valves including, but not limited to, so-called fire-resistant gate valves, standard gate valves, and gate valves designed for subsea or other underwater use, both manually actuated as well as those with hydraulic, pneumatic or electrical actuators attached thereto. Furthermore, the invention can be embodied in gate valves wherein the flow passage through the gate is in either the lower portion of the gate as shown in the drawings, or in the upper portion of the gate (not shown).

BRIEF DESCRIPTION OF THE DRAWINGS

FIG. 1 is a fragmentary view, partially in central vertical section and partially in side elevation, of a fire-resistant type gate valve embodying the present invention in the form of a port in the valve gate which is shown in its normally closed position.

FIG. 2 is an enlarged fragmentary view of a portion of the valve of FIG. 1, showing the valve gate in a slightly backed off, yet still closed, position and the port blocked off.

FIGS. 3 and 4 are views similar to FIG. 2, but illustrating a groove in the face of the valve gate as another embodiment of the invention.

FIGS. 5 and 6 are views somewhat like FIGS. 3 and 4, but illustrating another type of valve and a different location of the port in the valve gate.

FIGS. 7 and 8 are views like FIGS. 5 and 6, but illustrating a groove in another location in the valve gate.

DESCRIPTION OF THE EMBODIMENTS

FIGS. 1 & 2

As seen in FIG. 1, one embodiment of the present invention is illustrated in a fire-resistant type gate valve 10 that includes a valve body 12 with a flow passage 14 and a valve gate chamber 16 intersecting the flow passage 14, a bonnet 18 releasably secured to the top of the valve body 12 by a plurality of circumferentially spaced threaded studs 20 and nuts 22, a valve gate 24 having a flow passage 26 through its lower portion, a non-rising type of valve stem 28 extending from the gate 24 through the bonnet 18, and a hand wheel 30 attached to the top of the stem 28 for rotating the stem and thereby raising and lowering the gate 24 between the gate's illustrated fully closed position and its open position (not shown) wherein the flow passages 14, 26 are co-axial. In this embodiment the stem 28 and the gate 24 are linked together by a lost motion connection comprising a nut 32 that threadedly engages the lower end of the stem, and a vertically elongated slot 34 in the upper end area of the gate and in which the nut 32 resides.

Near the upper end of the stem 28 is an annular spacer 36 of eutectic or fusible material that will melt when subjected to elevated temperature, such as if the valve were involved in a fire. When such melting occurs the pressure in the valve body chamber 16, augmented by the axially directed force of a compressed helical spring 38 surrounding the stem 28 below the eutectic spacer 36, will cause the stem to move upwardly (outwardly) until a radial stop shoulder 40 on the stem above its lower threaded portion 28a comes to rest against an annular stop element 42 threaded into the lower face of the bonnet 18. As this upward movement of the stem 28 occurs an enlarged diameter portion 28b of the stem moves up into engagement with an inner annular sealing lip of a metal seal ring or element 44, thereby establishing a metal-to-metal fluid-tight seal between the stem 28 and the bonnet 18. In this condition the valve is considered backseated, and can be serviced such as by removing and replacing the annular packing 46 and the other elements above that packing.

Between the valve gate 24 and the valve body 12 are annular seat elements or assemblies 50, 52 that reside in enlarged diameter portions of the valve's flow passage 14. The seat assemblies 50, 52 function to provide a fluid-tight seal between the valve gate 24 and the body 12, and in the illustrated embodiment the seat assembly 50 is located on the inlet side of the valve and seals against the opposed face 24a of the gate. Extending between the gate face 24a and a vertical bore 54 in the interior of the gate is a pressure relief port 56 that, when the gate 24 is in its illustrated normally closed position, provides communication between the flow passage inlet 14a and the bore 54, and thus into the valve gate chamber 16 via a lateral relief port 58 that extends from the bore 54 through the gate into the chamber 16.

Accordingly, in this condition the valve 10 is in a uni-directional sealing mode, that is pressure on the inlet side cannot get past the outlet side seat element 52, whereas pressure entering the valve from the outlet side flows between the seat element 52 and the gate 24 into the valve chamber 16 and thence through the port 58 into the bore 54 from where it can escape through the relief port 56 into the inlet passage. In this uni-directional sealing mode the valve 10 thereby provides a means to vent undesired pressure build-up both in the valve chamber 16 and, for example, a pipe line or other conduit (not shown) extending from the outlet passage 14b to the inlet side of another gate valve (not shown) such as would be found in a conventional oil or gas wellhead christmas tree.

When the hand wheel 30 is rotated sufficiently to take up the lost motion in the connection between the stem 28 and the gate 24, and further rotated to back off (raise) the gate 24 into its position shown in FIG. 2, although the flow passage is still fully closed by the upper portion of the gate the pressure relief port 56 is blocked (closed off) by the inlet passage seat assembly 50. Therefore, with the gate 24 in this position any pressure build-up in the outlet flow passage 14b is prevented from entering the seat assembly 50 and the inlet flow passage 14a, and the valve 10 is in a bi-directional sealing mode. In this mode the valve 10 can be pressure-tested in either direction, a highly desirable advantage when the valve is employed in a wellhead christmas tree wherein pressure testing from the outlet side is standard operating procedure.

FIGS. 3 & 4

In this embodiment of the present invention a valve gate 60 with a flow passage 61 has been substituted for the valve gate 24, but the rest of the valve elements remain the same as in the FIGS. 1 & 2 embodiment. Valve gate 60 has a groove 62 in its inlet face 60a that functions in similar manner to the port 56 in the valve gate 24, whereby in the gate's normally closed position (FIG. 3) the groove straddles the inlet passage seat assembly 50 to provide communication between the inlet passage 14a and the valve gate chamber 16, albeit directly rather than through the gate bore 54 and lateral relief port 58 as in the FIGS. 1 and 2 embodiment. Thus the valve gate 60 provides both unidirectional and bi-directional sealing capability to the valve, and has the same advantages possessed by the embodiment of FIGS. 1 and 2.

FIGS. 5 & 6

The embodiment of the invention illustrated in FIGS. 5 and 6 provides for a fully automatic or self-induced uni-directional sealing mode when the valve is subjected to fire conditions. Under normal operating conditions the valve is bi-directional sealing and requires no special techniques, such as rotating the handwheel to back off the gate, to change to uni-directional sealing when a fire occurs.

In this embodiment of the invention there is no lost motion connection between the valve stem 28 and the gate 70, and a pressure relief port 72, located near the lower end of the gate's inlet face 70a, extends between the face 70a and the gate's flow passage 74. In all other respects the valve can be identical to the fire resistant type of FIG. 1, or can be a standard gate valve without a eutectic element.

When the embodiment of FIGS. 5 and 6 is employed in a fire-resistant valve such as 10 of FIG. 1, in the gate's normally closed position (FIG. 5) the pressure relief port is blocked by the inlet passage seat assembly 50. When the eutectic 36 (FIG. 1) melts, the stem 28 rises and pulls the gate 70 into the position shown in FIG. 6, thereby exposing the relief port 72 to the valve's inlet flow passage 14a and creating communication between that flow passage and the gate chamber 16. In this FIG. 6 position the gate 70 provides uni-directional sealing in the normal flow direction, and pressure relief protection in the reverse direction.

When the valve gate 70 is employed in a standard gate valve, the gate is shifted between its normally closed bi-directional sealing position (FIG. 5) and its backed off uni-directional sealing position (FIG. 6) by rotating the hand wheel or activating the valve actuator, depending upon how the valve is equipped.

FIGS. 7 & 8

A valve gate 80 according to this embodiment of the invention has a groove 82 in its inlet face 80a, such as near the upper end of the face 80a as illustrated, that straddles the inlet passage seat assembly 50 to provide communication between the inlet passage 14a and the gate chamber 16 when the gate 80 has been backed off from its normally closed bi-directional sealing position (FIG. 7) into its uni-directional sealing position (FIG. 8). As in the embodiment of FIGS. 5 and 6, the movement of the gate 70 is accomplished either automatically in a fire-resistant type valve such as 10 (FIG. 1) by melting of the eutectic element, or by hand wheel rotation, valve actuator activation or other means employed with a standard type gate valve. Accordingly, the gate 80 provides the same advantages as obtainable with the valve gate 70.

As should be apparent from the foregoing, each of the described embodiments of the present invention provides a relatively simpe, inexpensive and virtually fool-proof means of insuring that high pressure build-ups will not occur in service, and also provides a means for pressure testing valves from either end.

Although the best mode contemplated for carrying out the present invention has been herein shown and described, it will be apparent that modification and variation may be made without departing from what is regarded to be the subject matter of the invention.

We claim:

1. A method of changing the sealing mode of a gate valve from bi-directional to uni-directional, said gate valve comprising:
   (a) a valve body with a flow passage, a gate valve chamber intersecting said flow passage, a bi-faced valve gate in the chamber, and valve seat means;
   (b) the valve gate being positionable in a range of bi-directional flow positions to pass fluid flow in the passage;
   (c) the valve gate, in cooperation with the valve seat means, operable in a first position to provide bi-directional sealing;
   (d) the valve gate having relief port means operable in a second position of the valve gate to provide communication between the gate valve chamber and a first face of the valve gate, the valve seat means cooperating with a second face of the valve gate to block fluid flow directed out from the second face into the passage in the case of the first face facing upstream and the second face facing downstream, but to let fluid flow in the opposite direction past said second face into the gate chamber and thence through the relief port means and out from the first face; and
   (e) means for moving the valve gate between the positions;
   the method comprising the steps of:
   (1) operating the moving means for placing the valve gate in one of the bi-directional flow positions or the first position; and
   (2) operating the moving means to station the valve gate in the second position for uni-directional sealing.

2. A method of changing the sealing mode of a gate valve from uni-directional to bi-directional, said gate valve comprising:
   (a) a valve body with a flow passage, a gate valve chamber intersecting said flow passage, a bi-faced valve gate in the chamber, and valve seat means;
   (b) the valve gate being positionable in a range of bi-directional flow positions to pass fluid flow in the passage;
   (c) the valve gate, in cooperation with the valve seat means, operable in a first position to provide bi-directional sealing;
   (d) the valve gate having relief port means operable in a second position of the valve gate to provide communication between the gate valve chamber and a first face of the valve gate, the valve seat means cooperating with a second face of the valve gate to block fluid flow directed out from the second face into the passage in the case of the first face facing upstream and the second face facing downstream, but to let fluid flow in the opposite direction past said second face into the gate chamber and thence through the relief port means and out from the first face; and
   (e) means for moving the valve gate between the positions;
   the method comprising the steps of:
   (1) operating the moving means to station the valve gate in the second position for uni-directional sealing, and
   (2) operating the moving means for placing the valve gate in one of the bi-directional flow positions or the first position.

* * * * *